United States Patent
Krude et al.

(10) Patent No.: US 7,011,594 B2
(45) Date of Patent: Mar. 14, 2006

(54) DIFFERENTIAL HAVING INTEGRATED HOMOCINETIC JOINTS

(75) Inventors: Werner Krude, Neunkirchen-Seelscheid (DE); Colin Zaers, Siegburg (DE); Heinzwilli Fuchs, Mühleip (DE)

(73) Assignee: GKN Automotive GmbH, Lohmar (DE)

( * ) Notice: Subject to any disclaimer, the term of this patent is extended or adjusted under 35 U.S.C. 154(b) by 92 days.

(21) Appl. No.: 10/478,228

(22) PCT Filed: Mar. 16, 2002

(86) PCT No.: PCT/EP02/02943

§ 371 (c)(1),
(2), (4) Date: Nov. 20, 2003

(87) PCT Pub. No.: WO02/096692

PCT Pub. Date: Dec. 5, 2002

(65) Prior Publication Data

US 2004/0152554 A1 Aug. 5, 2004

(30) Foreign Application Priority Data

May 26, 2001 (DE) ................................ 101 25 793

(51) Int. Cl.
*F16H 48/06* (2006.01)
(52) U.S. Cl. ..................................................... 475/222
(58) Field of Classification Search ............... 475/222, 475/230; 464/145, 905, 906
See application file for complete search history.

(56) References Cited

U.S. PATENT DOCUMENTS

| 1,128,429 | A |   | 2/1915 | Fetzer |
| 2,187,843 | A | * | 1/1940 | Rzeppa .................... 475/222 |
| 4,733,578 | A | * | 3/1988 | Glaze et al. ............... 475/246 |
| 4,840,087 | A | * | 6/1989 | Welschof et al. .......... 475/222 |

FOREIGN PATENT DOCUMENTS

| DE | 3000298 | * | 10/1980 |
| DE | 35 46 522 A1 |   | 7/1987 |
| DE | 198 54 215 A1 |   | 5/2000 |
| GB | 510 653 |   | 8/1939 |
| JP | 10-309957 | * | 11/1998 |

* cited by examiner

Primary Examiner—Ha Ho
(74) Attorney, Agent, or Firm—Artz & Artz, P.C.; Robert P. Renke (57) ABSTRACT

A differential drive having a drivable differential carrier (11) which is rotatably supported in a drive housing, which comprises a longitudinal carrier axis, in which two axle shaft gears (28, 29) whose axes extend co-axially relative to the longitudinal carrier axis are arranged and rotatably supported and in which a plurality of differential gears (31) whose axes extend radially relative to the longitudinal carrier axis are arranged and held so as to rotate with said differential carrier (11,) wherein the axle shaft gears (28, 29) engage the differential gears (31, 71;) and having constant velocity joints (22, 23) which are positioned inside the differential carrier (11) and whose outer joint parts (26, 27) are connected to the axle shaft gears (28, 29) in a rotationally fast way, wherein the outer joint parts (26, 27) and the axle shaft gears (28, 29) connected to the outer joint parts (26, 27) are positioned in the differential carrier (11) with radial play and are operationally engaged with at least three differential gears (31) for being self-centered on the longitudinal carrier axis.

19 Claims, 5 Drawing Sheets

DIFFERENTIAL HAVING INTEGRATED HOMOCINETIC JOINTS

BACKGROUND OF THE INVENTION

The invention relates to a differential drive having a drivable differential carrier which is rotatably supported in a drive housing, which comprises a longitudinal carrier axis, in which two axle shaft gears whose axes extend co-axially relative to the longitudinal carrier axis are arranged and rotatably supported and in which a plurality of differential gears whose axes extend radially relative to the longitudinal carrier axis are arranged and held so as to rotate with said differential carrier, wherein the axle shaft gears engage the differential gears; and having constant velocity joints which are positioned inside the differential carrier and whose outer joint parts are connected to the axle shaft gears in a rotationally fast way.

A differential drive of said type with integrated constant velocity universal joints is known from U.S. Pat. No. 2,187,843. In a first embodiment, the differential carrier consists of a cup and a cover with an integrally formed-on ring gear. The outer joint parts are provided in the form of conical axle shaft gears which engage bevel differential gears. In a further embodiment, the differential carrier is undivided and there is provided a central assembly opening through which the constant velocity joints can be inserted one after the other. In this case, the outer joint parts are provided in the form of crown gears and the differential gears in the form of straight spur gears. In both embodiments, the differential gears are held at a radial distance from one another by spacing elements and run on a journal inserted radially into bores in the differential carrier. The axle shaft gears are centered directly in the differential carrier.

SUMMARY OF THE INVENTION

It is the object of the present invention to propose a differential carrier of said type which has been simplified and can thus be produced more cheaply.

The objective is achieved by providing a differential drive of said type wherein the outer joint parts and the axle shaft gears connected to the outer joint parts are positioned in the differential carrier with radial play and are operationally engaged with at least three differential gears for being self-centered on the longitudinal carrier axis. These measures succeed in substantially de-refining the differential design while simultaneously reducing friction and increasing the service life. The axle shaft gears normally slidingly supported in the differential carrier are no longer in contact with the carrier so that neither the inner face of the carrier nor the surface of the outer joint part have to be provided with high-grade surface qualities. In particular, the operations of grinding and hardening said surfaces can be eliminated altogether, so that the production costs are reduced. The large radial play and the design-related air gap between the differential carrier and the outer joint parts results in less stringent requirements regarding the production accuracy in respect of axis centricity, i.e. greater tolerances are permitted on both surfaces. Production is substantially de-refined. Furthermore, said air gap has an advantageous effect in that assembly is facilitated because the outer joint parts can be inserted into the differential carrier in a substantially contact-free and friction-free way.

The only sliding support or support provided by rolling contact members on the outer joint parts takes place axially at the rear at covers and bases of the differential carrier.

In view of the self-centering ability of the axle shaft gears and thus of the outer joint parts on all the differential gears, the toothings are subjected to a uniform load, which also results in optimum lubricating conditions. The radial fixing of the differential gears is substantially symmetric relative to the longitudinal carrier axis.

According to a first embodiment it is proposed that between the axle shaft gears in the differential carrier there are arranged at least three individual bearings which point radially towards the longitudinal carrier axis, and that there is provided a cross member which comprises a hub whose axis is aligned co-axially relative to the carrier axis and which is provided with at least three bearing journals which radially project from the hub and on which the differential gears are rotatably supported, wherein the bearing journals are inserted into the bearings and wherein the cross member is radially fixed. The cross member is preferably arranged in the differential carrier so as to be axially floating. In particular, it is proposed that the ends of the bearing journals displaceably engage longitudinal grooves or longitudinal slots in the differential carrier and that the ends of the bearing journals are flattened like key faces in that both the constant velocity joints and the differential gears, when being mounted on the cross member, can be inserted axially into the differential carrier, in particular that they can all be inserted from one end. Because of the axially floating arrangement of the cross member with the bearing journals of the differential gears, the differential gears are automatically set centrally between the axle shaft gears, so that any optional means for compensating for play need to be inserted at only one end of the differential carrier. The cross member preferably comprises three bearing journals, so that it centers itself in the uniformly circumferentially distributed bearings in the differential carrier without there being any need for radial securing means. The three bearings can be provided directly in the differential carrier.

A further preferred embodiment consists in that, between the axle shaft gears in the differential carrier, there are arranged at least three individual bearings which point radially towards the longitudinal carrier axis and that the differential gears comprise outer journals and that the outer journals of the differential gears are rotatably supported in the bearings, so as to be radially fixed. In particular, it is proposed that the bearings are provided in bearing bushes whose diameter is greater than the diameter of the differential gears, so that the latter can be inserted radially through the respective openings for the bearing bushes. The bearing bushes are then secured by standard securing means in the differential carrier. In this way, the differential gears can be supported floatingly or cantilever-like. However, according to an advantageous embodiment it is proposed that between the axle shaft gears, there is arranged an annular journal carrier comprising circumferentially distributed bearings which are engaged by inner journals at the differential gears. In this way, the differential gears are supported twice. Said journal carrier can be produced so as to be integral with the differential carrier. In a preferred embodiment, there are provided four differential gears which have to be radially secured individually in four bearings or pairs of bearings in the differential carrier.

In both above-mentioned embodiments, the axle shaft gears are preferably produced as to be integral with the outer joint parts of the constant velocity joints. Furthermore, it is proposed that the axle shaft gears can be provided in the form of crown gears and the differential gears in the form of spur gears.

Because, in accordance with the invention, the axle shaft gears are self-centered on the differential gears, there have to be provided at least three uniformly circumferentially distributed differential gears. A number of four uniformly circumferentially distributed differential gears can also be realized, as described above.

Using larger differential gears is advantageous if the cylindrical inner face of the differential carrier has been provided with wide longitudinal grooves which partially receive the differential gears.

BRIEF DESCRIPTION OF THE DRAWINGS

Preferred embodiments of the invention are illustrated in the drawings and will be described below.

DETAILED DESCRIPTION OF THE INVENTION

Figure 1:
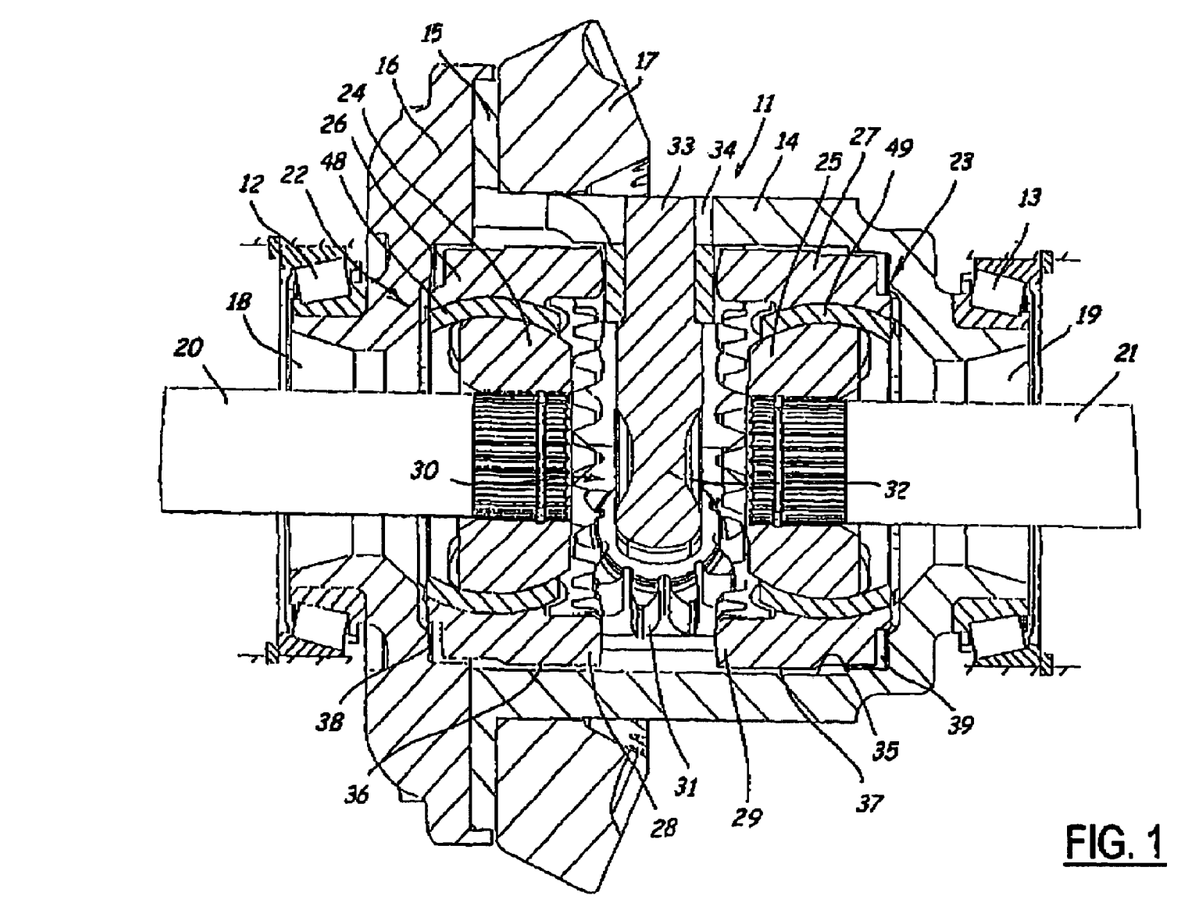
FIG. 1 shows a differential carrier with integrated constant velocity universal joints in a first embodiment in a longitudinal section.

FIG. 1 shows a differential carrier 11 which is provided with bearings 12, 13 supporting the differential carrier relative to a drive housing (not illustrated). The differential carrier substantially consists of a cup-shaped housing 14 with a formed-on flange 15, a cover 16 attached to the flange and a ring gear 17 which is bolted to the flange and which can be made to engage a driving pinion supported in the housing which is not illustrated. At the two ends of the assembled differential carrier 11, there are provided openings 18, 19 through which there are inserted axle shafts 20, 21 which are connected to the inner joint parts 24, 25 of constant velocity universal joints 22, 23 integrated into the differential carrier 11. Furthermore, the constant velocity universal joints 22, 23 comprise outer joint parts 26, 27, ball cages 48, 49 and torque transmitting balls which cannot be seen in FIG. 1 and which engage the joint parts and are held by the ball cages in one plane. The outer joint parts 26, 27 of the constant velocity universal joints are provided directly in the form of axle shaft gears 28, 29 with crown gear toothings. Said axle shaft gears 28, 29 engage differential gears 31 one of which is illustrated and which are provided in the form of spur gears. Between the axle shaft gears 28, 29 there is positioned a cross member 30 which comprises a hub 32 and bearing journals 33 radially projecting therefrom. The differential gears 31 are supported on the bearing journals 33. The journals 33 engage longitudinal slots 34 in the differential carrier, so that the differential gears 31 are held between the axle shaft gears 28, 29 under conditions of balanced forces. The outer joint parts 26, 27 are held by the differential gears 31 in a self-centered way, with an air gap 36, 37 being provided relative to the cylindrical inner face 35 of the differential carrier 11. The constant velocity joints 22, 23 are axially supported via play offsetting means 38, 39 in the differential carrier.

Figure 2:
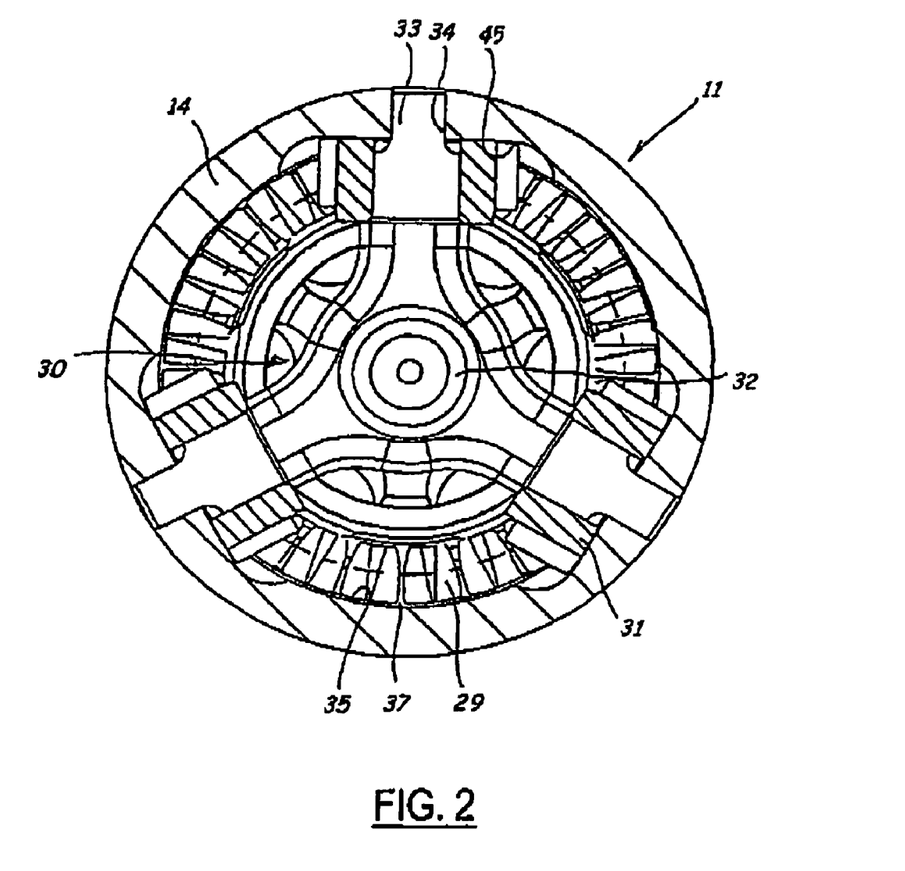
FIG. 2 shows a differential carrier according to FIG. 1 in a cross-section.

FIG. 2 shows the differential carrier 11 according to FIG. 1 in a cross-section according to the sectional line indicated therein. Inside the cup-like housing 14, there is positioned the cross member 30 which, as far as details are concerned, is shown to comprise a hub 32 and three bearing journals 33 in a symmetric arrangement. On the bearing journals 33, there are positioned the differential gears 31. The ends of the bearing journals engage the longitudinal slots 34 with an accurate, fit. In the inner face 35 of the housing 14, there are provided circumferentially distributed wide grooves 45 into which the differential gears 31 are partially countersunk.

The axle shaft gear 29 with its crown gear toothing can be seen behind the differential gears 31. The differential gears 31 are axially secured and run between steps on the bearing journal 33 and the base of the grooves 45.

Figure 3:
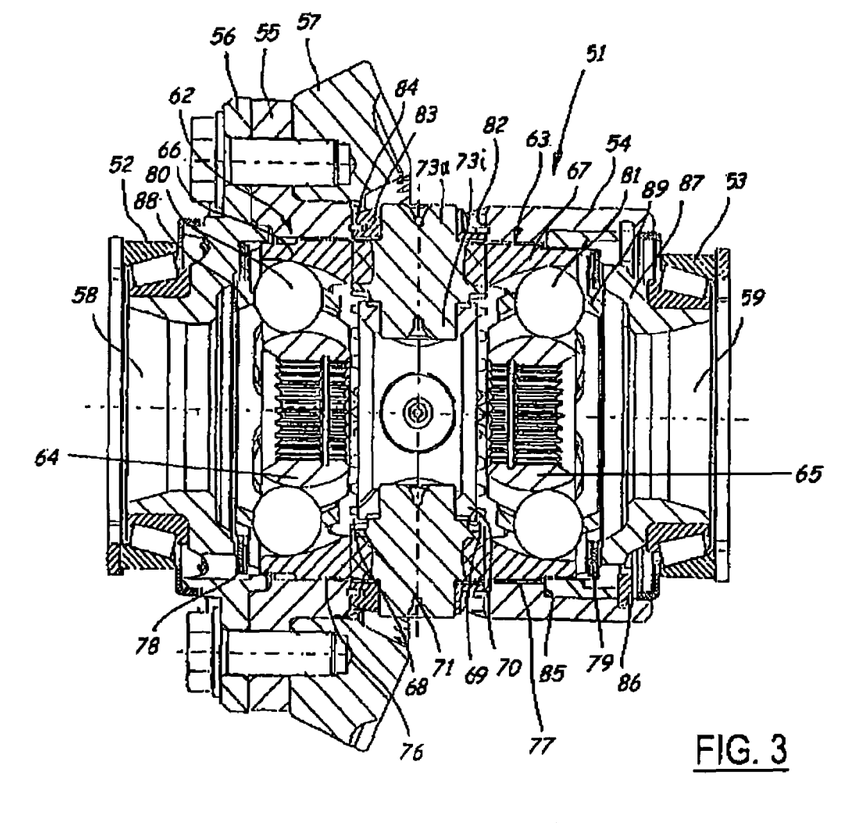
FIG. 3 shows a differential carrier with integrated constant velocity universal joints in a second embodiment in a longitudinal section.

FIG. 3 shows a differential carrier 51 which is provided with bearings 52, 53 which support the differential carrier relative to a drive housing (not illustrated). The differential carrier substantially consists of a cylindrical open casing 54 with a formed-on flange 55, a first cover 56 attached to the flange, and a second cover 87 inserted into the casing. Furthermore, a ring gear 57 which can be made to engage a driving pinion supported in the housing, which is not illustrated, is bolted to the flange 55. At both ends of the assembled differential carrier 51, the covers are provided with openings 58, 59 through which the axle shafts can be inserted. The latter can be connected to the inner joint parts 64, 65 of the constant velocity universal joints 62, 63 integrated into the differential carrier. Furthermore, the constant velocity universal joints comprise outer joint parts 66, 67, ball cages 88, 89 and torque transmitting balls 80, 81 which engage the joint parts and are held by the ball cages in a common plane. The outer joint parts 66, 67 of the constant velocity universal joints are provided, directly in the form of axle shaft gears 68, 69 with crown gear toothings. Said axle shaft gears 68, 69 engage differential gears 71 two of which are shown in section and which are provided in the form of spur gears. Between the axle shaft-gears 68, 69, there is positioned a journal carrier 70 which is engaged by radially inwardly pointing bearing journals 73a which run in bearing sleeves 83, which are radially inserted into bores 82 in the carrier 51 and which are radially secured therein by securing rings 84. The cover 87 is supported on a step 85 in the carrier 51 and is axially secured therein by a securing ring 86. The outer joint parts 66, 67 comprise circumferential faces which form radial air gaps 76, 77 relative to the cylindrical inner face 75 of the differential carrier 51. The constant velocity joints 62, 63 are axially supported via play offsetting means 78, 79 in the carrier. The bearing assembly of the differential carrier 51 is shown as a so-called X-bearing, i.e. the effective lines of the rolling contact bearings 52, 53 form two conical faces whose points point towards the carrier center.

Figure 4:
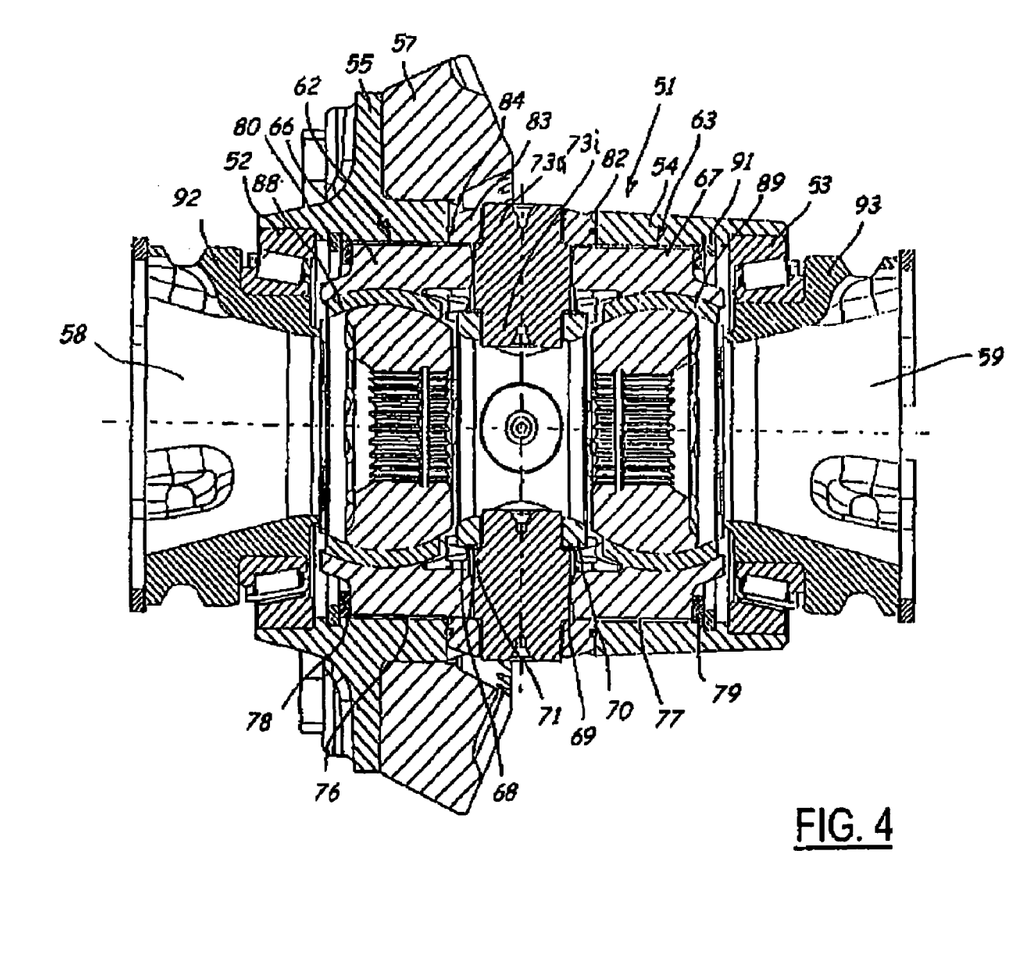
FIG. 4 shows a differential carrier with integrated constant velocity universal joints in a third embodiment in a longitudinal section.

FIG. 4 shows a differential carrier 51 provided with bearings 52, 53 which support the differential carrier relative to a drive housing (not illustrated). The differential carrier substantially consists of a cylindrically open casing 54 with a formed-on flange 55, of a first securing ring 90 inserted into the casing, and of a second securing ring 91 inserted into the casing. A ring gear 57 which can be made to engage a driving pinion supported in the housing (not illustrated) is bolted to the flange 55. At both ends of the assembled differential carrier 51, there are provided openings 58, 59 through which axle shafts can be inserted. Said axle shafts can be connected to the inner joint parts 64, 65 of the constant velocity joints 62, 63 integrated into the differential carrier. Furthermore, the constant velocity universal joints comprise outer joint parts 66, 67, ball cages 88, 89 and torque transmitting balls (not illustrated) which engage the joint parts and are held by the ball cages in a common plane. The outer joint parts 66, 67 of the constant velocity universal joints are provided directly in the form of axle shaft gears 68, 69 with crown gear toothings. Said axle shaft gears 68, 69 engage differential gears 71 of which two are shown in section and which are provided in the form of spur gears. Between the axle shaft gears 68, 69, there is positioned a journal carrier 70 which is produced to be integral with the casing 54 of the differential carrier 51 and which is engaged by radially inwardly pointing bearing journals 73*i* of the differential gears 71. Furthermore, the differential gears comprise radially outwardly pointing bearing journals 73*a* which run in bearing bushes 83 which are radially inserted into bores 82 in the casing 54 and radially secured therein by securing rings 84. The outer joint parts 66, 67 comprise circumferential faces which form radial air gaps 76, 77 relative to the cylindrical inner face 75 of the differential carrier 51. The constant velocity joints 62, 63 are axially supported via play offsetting means 78, 79 on the securing rings 90, 91 in the carrier. The rolling contact bearings 52, 53 are held by bearing holding rings 92, 93 which can be inserted into a drive housing. In this embodiment, the bearing assembly of the differential carrier 51 is provided in the form of an O-bearing, i.e. the effective lines of the rolling contact bearings 52, 53 form two conical faces which, by means of their points, point outwardly from the carrier center.

Figure 5:
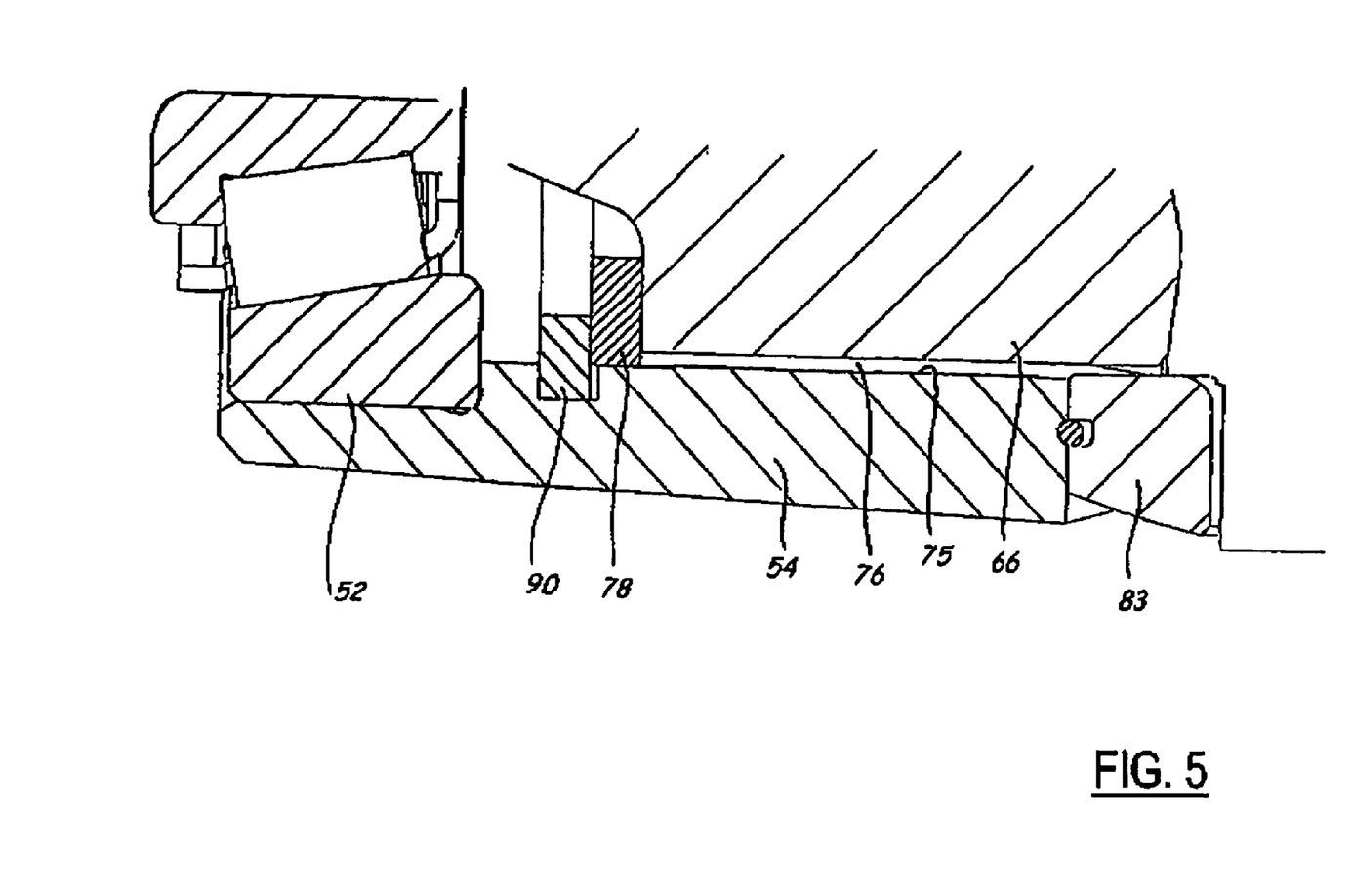
FIG. 5 shows an enlarged detail of a differential carrier according to FIG. 4.

FIG. 5 shows in an enlarged scale that the outer joint part 66 forms a radial air gap 76 relative to the inner face 75 of the casing 54.

LIST OF REFERENCE NUMERALS 11, 51 differential carrier
12, 52 bearing
13, 53 bearing
14, 54 dish, casing
15, 55 flange
16, 56 cover
17, 57 ring gear
18, 58 opening
19, 59 opening
20 - axle shaft
21 - axle shaft
22, 62 constant velocity joint
23, 63 constant velocity joint
24, 64 inner joint part
25, 65 inner joint part
26, 66 outer joint part
27, 67 outer joint part
28, 68 axle shaft gear
29, 69 axle shaft gear
30, 70 cross member, journal carrier
31, 71 differential gear
32 - hub
33, 73 bearing journal
34 - slot
35, 75 inner face
37, 76 air gap
37, 77 air gap
38, 78 play offsetting means
39, 79 play offsetting means
80 ball
81 ball
82 bore
83 bearing bush
84 securing ring
85 step
86 securing ring
87 cover
48, 88 ball cage
49, 89 ball cage
90 securing ring
91 securing ring
92 bearing holding ring
93 bearing holding ring

What is claimed is:

1. A differential drive comprising:
   a drivable differential carrier (11, 51) which is rotatably supported in a drive housing, which comprises a longitudinal carrier axis;
   two axle shaft gears (28, 29; 68, 69) whose axes extend co-axially relative to the longitudinal carrier axis arranged and rotatably supported in said differential carrier (11, 51);
   a plurality of differential gears (31, 71) whose axes extend radially relative to the longitudinal carrier axis arranged and held in said differential carrier (11, 51) so as to rotate with said differential carrier (11, 51), wherein the axle shaft gears (28, 29; 68, 69) engage the differential gears (31, 71); and
   constant velocity joints (22, 23; 62, 63) which are positioned inside the differential carrier (11, 51) and whose outer joint parts (26, 27; 66, 67) are connected to the axle shaft gears (28, 29; 68, 69) in a rotationally fast way,
   wherein the outer joint parts (26, 27; 66, 67) and the axle shaft gears (28, 29; 68, 69) connected to the outer joint parts (26, 27; 66, 67) are positioned in the differential carrier (11, 51) with radial play and are operationally engaged with at feast three differential gears (31, 71) for being self-centered on the longitudinal carrier axis.

2. A differential drive according to claim 1, comprising at least three individual bearings arranged between the axle shaft gears (28, 29) in the differential carrier (11) which point radially towards the longitudinal carrier axis, and a cross member (30) which comprises a hub (32) whose axis is aligned co-axially relative to the carrier axis and which is provided with at least three bearing journals (33) which radially project from the hub (32) and on which the differential gears (31) are rotatably supported, wherein the bearing journals (33) engage the bearings and wherein the cross member (30) is radially fixed.

3. A differential drive according to claim 2, wherein the bearings are slots (34) provided in the differential carrier (11) and the cross member (30) is arranged in the differential carrier (11) so as to be axially floating.

4. A differential drive according to claim 2 wherein the cross member (30) is held, in a self-centered way, in the at least three bearings in the differential carrier (11).

5. A differential drive according to claim 4, wherein the differential gears (71) comprise outer journals (73*a*) which are rotatably supported in the bearings so as to be radially fixed.

6. A differential drive according to claim 5, wherein the bearings are formed in bearing bushes (83) which are inserted into the differential carrier (51) and secured therein.

7. A differential drive according to claim 5 comprising an annular journal carrier (70) arranged between the axle shaft gears (68, 69) which comprises circumferentially distributed bearings engaged by inner journals (78*i*) of the differential gears (71).

8. A differential drive according to claim 4 wherein the plurality of differential gears comprises four differential gears and the at least three bearings comprises four bearings, wherein each differential gear is individually radially fixed in a corresponding bearing in the differential carrier.

9. A differential drive according to claim 1, wherein the axle shaft gears (28, 29; 68, 69) are formed so as to be integral with the outer joint parts (26, 27; 66, 67) of the constant velocity joints (22, 23; 62, 63).

10. A differential drive according to claim 1, wherein the axle shaft gears (28, 29; 68, 69) are crown gears and the differential gears (31, 71) are spur gears.

11. A differential drive according to claim 3 wherein the cross member (30) is held, in a self-centered way, in the at least three bearings in the differential carrier (11).

12. A differential drive according to claim 11 wherein the differential gears (71) comprise outer journals (73*a*) which are rotatably supported in the bearings so as to be radially fixed.

13. A differential drive according to claim 12, wherein the bearings are formed in bearing bushes (83) which are inserted into the differential carrier (51) and secured therein.

14. A differential drive according to claim 6 comprising an annular journal carrier (70) arranged between the axle shaft gears (68, 69) which comprises circumferentially distributed bearings engaged by inner journals (78*i*) of the differential gears (71).

15. A differential drive according to claim 5 wherein the plurality of differential gears comprises four differential gears and the at least three bearings comprises four bearings, wherein each differential gear is radially fixed in a corresponding bearing in the differential carrier.

16. A differential drive according to claim 6 wherein the plurality of differential gears comprises four differential gears and the at least three bearings comprises four bearings, wherein each differential gear is radially fixed in a corresponding bearing in the differential carrier.

17. A differential drive according to claim 2, wherein the axle shaft gears (28, 29; 68, 69) are formed so as to be integral with the outer joint parts (26, 27; 66, 67) of the constant velocity joints (22, 23; 62, 63).

18. A differential drive according to claim 2, wherein the axle shaft gears (28, 29; 66, 69) are crown gears and the differential gears (31, 71) are spur gears.

19. A differential drive according to claim 9, wherein the axle shaft gears (28, 29; 68, 69) are crown gears and the differential gears (31, 71) are spur gears.

* * * * *

UNITED STATES PATENT AND TRADEMARK OFFICE
CERTIFICATE OF CORRECTION

PATENT NO.        : 7,011,594 B2
APPLICATION NO. : 10/478228
DATED              : March 14, 2006
INVENTOR(S)      : Werner Krude, Colin Zaers and Heinzwilli Fuchs It is certified that error appears in the above-identified patent and that said Letters Patent is hereby corrected as shown below:

Column 6,
Line 39, should read as follows: -- engaged with at least three differential gears (31,71) --

Signed and Sealed this

Twenty-fifth Day of July, 2006

JON W. DUDAS
*Director of the United States Patent and Trademark Office*